(12) United States Patent
Liebhold et al.

(10) Patent No.: US 7,937,671 B2
(45) Date of Patent: May 3, 2011

(54) METHOD FOR MODIFYING A LIST OF ITEMS SELECTED BY A USER, NOTABLY A PLAY LIST OF AN AUDIO AND/OR VIDEO APPARATUS, AND AUDIO AND/OR VIDEO APPARATUS ALLOWING PLAY LISTS

(75) Inventors: Valerie Liebhold, Carmel, IN (US); Lan Ying Tow, Woodlands (SG)

(73) Assignee: Thomson Licensing, Boulogne Billancourt (FR)

( * ) Notice: Subject to any disclaimer, the term of this patent is extended or adjusted under 35 U.S.C. 154(b) by 783 days.

(21) Appl. No.: 10/522,270

(22) PCT Filed: Jul. 17, 2003

(86) PCT No.: PCT/EP03/50317
§ 371 (c)(1),
(2), (4) Date: Jan. 25, 2005

(87) PCT Pub. No.: WO2004/012194
PCT Pub. Date: Feb. 5, 2004

(65) Prior Publication Data
US 2006/0015899 A1     Jan. 19, 2006

(30) Foreign Application Priority Data
Jul. 25, 2002 (EP) .................................... 02291894

(51) Int. Cl.
*G06F 3/048* (2006.01)

(52) U.S. Cl. ........ 715/828; 715/255; 715/716; 715/723; 715/727; 725/43; 725/44; 725/45; 725/46

(58) Field of Classification Search ............. 725/43–46; 715/255, 716, 723, 727, 828
See application file for complete search history.

(56) References Cited

U.S. PATENT DOCUMENTS

| 5,287,514 A | 2/1994 | Gram |
| 5,872,568 A | 2/1999 | Alimpich et al. |
| 5,986,979 A | 11/1999 | Bickford et al. |
| 6,118,450 A | 9/2000 | Proehl et al. |

(Continued)

FOREIGN PATENT DOCUMENTS

WO     WO 00/28396     5/2000

OTHER PUBLICATIONS

Search Report Dated Nov. 7, 2003.

*Primary Examiner* — Kieu Oanh Bui
*Assistant Examiner* — Nnenna Ekpo
(74) *Attorney, Agent, or Firm* — Robert D. Shedd; Paul P. Kiel

(57) ABSTRACT

A method for modifying a play list in an audio and/or video apparatus is proposed. This methods notably comprises the steps of: displaying available tracks in a first area, displaying the current play list in a second are, determining a track to be considered depending on a first user action, indicating the track to be considered by highlighting it in the first area, upon a second user action, removing, if existing, the last occurrence of the track to be considered in the play list displayed in the second area.

10 Claims, 5 Drawing Sheets

U.S. PATENT DOCUMENTS

| | | |
|---|---|---|
| 6,356,971 B1 | 3/2002 | Katz et al. |
| 6,446,080 B1 * | 9/2002 | Van Ryzin et al. ........ 707/104.1 |
| 6,721,489 B1 * | 4/2004 | Benyamin et al. .............. 386/46 |
| 7,426,537 B2 * | 9/2008 | Lee et al. ...................... 709/204 |
| 2001/0018858 A1 | 9/2001 | Dwek |
| 2002/0045960 A1 | 4/2002 | Philips et al. |
| 2002/0069412 A1 | 6/2002 | Philips |
| 2002/0113824 A1 * | 8/2002 | Myers, Jr. ..................... 345/810 |
| 2003/0023975 A1 * | 1/2003 | Schrader et al. ................ 725/51 |
| 2004/0148419 A1 * | 7/2004 | Chen et al. .................... 709/231 |

* cited by examiner

METHOD FOR MODIFYING A LIST OF ITEMS SELECTED BY A USER, NOTABLY A PLAY LIST OF AN AUDIO AND/OR VIDEO APPARATUS, AND AUDIO AND/OR VIDEO APPARATUS ALLOWING PLAY LISTS

This application claims the benefit, under 35 U.S.C. §365 of International Application PCT/EP03/50317, filed Jul. 17, 2003, which was published in accordance with PCT Article 21(2) on Feb. 5, 2004 in English and which claims the benefit of European patent application No. 02291894.0, filed Jul. 25, 2002.

FIELD OF THE INVENTION

The invention relates to a method for modifying a list of items selected by a user, notably a play list of an audio and/or video apparatus, and to an audio and/or video apparatus allowing play lists.

BACKGROUND

In an audio and/or video apparatus, the data to be played are often arranged in tracks so that the user can have a quick access to the part he wants to listen or watch. The track corresponds for instance to a song in an audio apparatus and to a part of a movie in a video apparatus.

For the user's convenience, it has been further proposed to play only selected tracks in a preferred order according to a play list. Before being played, the play list has to be determined by the user by a selection among available tracks. Several methods have already been proposed to create and modify a play list.

U.S. Pat. No. 5,986,979 describes a method for manipulating a play list without referring display. This method may be of interest when it is desirable not to rely on a display, for instance in a car.

Methods using a display to view and manipulate a play list have been proposed, notably for personal computers (PC), as described for instance in U.S. Pat. Nos. 6,118,450 and 6,356,971 or patent application WO 00/28 396. To modify the play list, these solutions use conventional PC techniques, such as the "drag-and-drop" feature.

U.S. Pat. No. 5,872,568 discloses one possible method for determining user-list of values from pre-defined values. In a first mode (FIG. 4), this document proposes to highlight the selected values in the total list of pre-defined values. This solution however cannot be used for a play list where the order of tracks to be played can be changed by the user. FIG. 6 shows a second mode where it is possible to remove a value from the user-list box by highlighting it in the same box and activating a screen area labelled "Delete".

The invention aims at a new method for modifying a list of items selected from a set of available items, notably a play list taken from available tracks, which is easy to handle for the user and gives him a clear view of what he is doing.

SUMMARY OF THE INVENTION

The invention proposes a method for modifying a play list in an audio and/or video apparatus, comprising the steps of displaying in a first area of a screen a representation of at least part of available tracks, displaying in a second area of the screen at least part of the current play list, determining a track to be considered upon a first user action, indicating the track to be considered by a specific representation in the first area of the track to be considered and, upon a second user action, removing, if existing, the last occurrence of the track to be considered in the play list displayed in the second area.

Preferably, the first user action and the second user action are actions on a remote-control which sends signals to the apparatus. The specific representation of the track to be considered may be highlighting the representation in the first area of the track to be considered.

The invention also proposes a method for modifying a play list in an audio and/or video apparatus, comprising the steps of generating video signals defining a screen with a first area displaying a representation of at least part of available tracks and a second area displaying at least part of the current play list, determining a track to be considered upon receiving a first signal from a user interface, indicating the track to be considered by generating video signals defining a specific representation in the first area of the track to be considered and, upon receiving a second signal from the user interface, removing, if existing, the last occurrence of the track to be considered in the play list displayed in the second area.

Advantageously, the user interface receives signals from a remote-control. The specific representation of the track to be considered may be highlighting the representation in the first area of the track to be considered.

The invention also proposes an audio and/or video apparatus having a media reader to read a medium where the data are organised in tracks, and a memory able to store a play list, comprising video means generating video signals defining a screen with a first area displaying a representation of at least part of the tracks and a second area displaying at least part of the play list, a user interface for receiving a first signal determining a track to be considered, wherein the video means are meant to indicate the track to be considered by generating video signals defining a specific representation in the first area of the track to be considered, and control means for removing, if existing, the last occurrence of the track to be considered in the play list upon receiving a second signal by the user interface.

Advantageously, the user interface receives the first signal and the second signal from a remote-control. The specific representation of the track to be considered may be highlighting the representation in the first area of the track to be considered.

More generally, the invention proposes a method for modifying a list of items selected by a user from a given set, comprising the steps of displaying in a first area a representation of items of the given set, displaying in a second area a list representing at least part of the previously selected items, determining an item to be considered upon a first user action, indicating the item to be considered by a specific representation in the, first area of the item to be considered and, upon a second user action, removing, if existing, the last occurrence of the item to be considered in the list displayed in the second area.

BRIEF DESCRIPTION OF THE DRAWINGS

The invention and other features thereof will be understood in the light of the following description made with reference to the attached drawing where.

DETAILED DESCRIPTION

Figure 1:
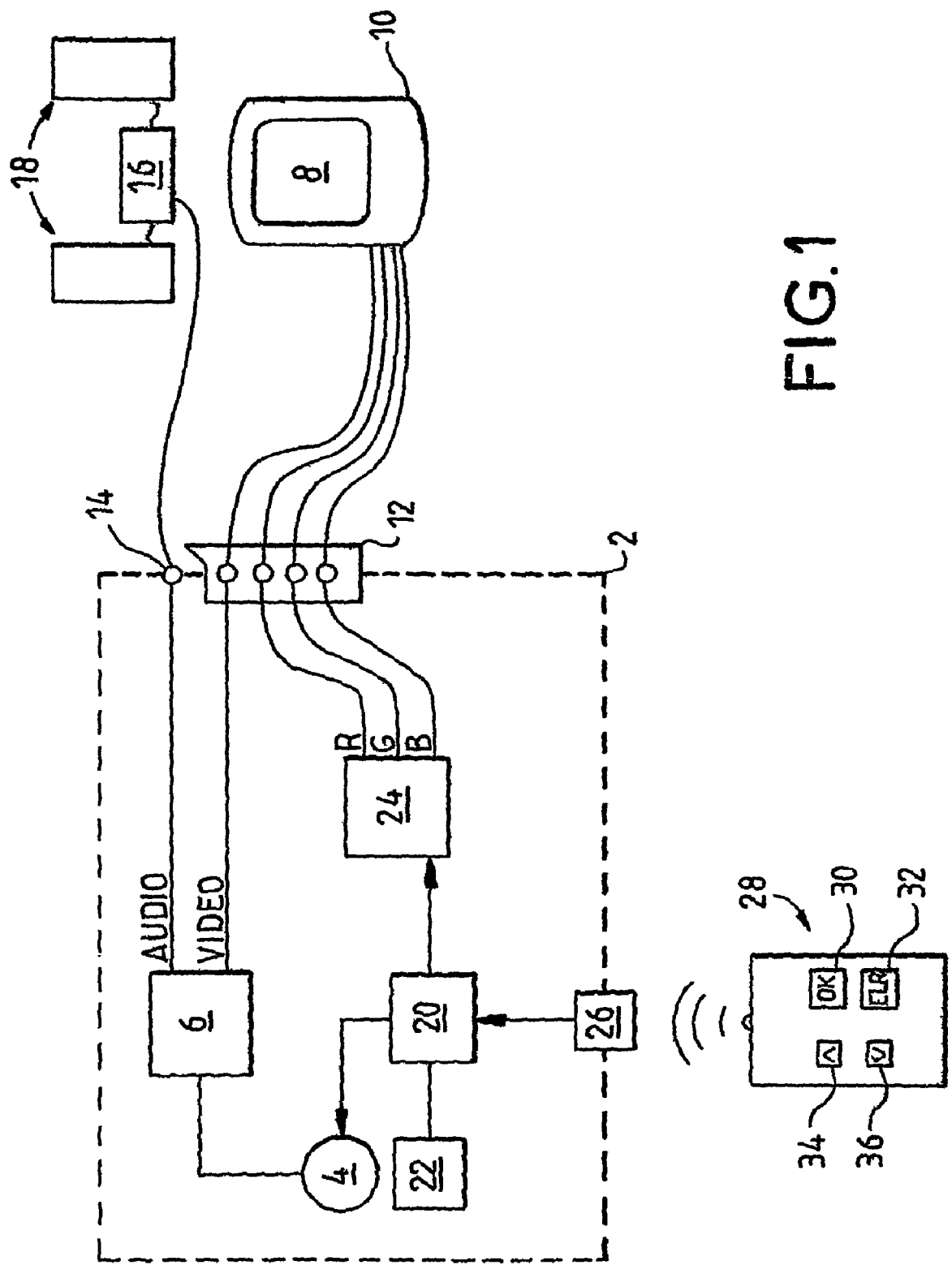
FIG. 1 represents a video and audio apparatus embodying the invention.

A video and audio player 2 is schematically represented at FIG. 1. The player 2 has a disc reader 4 which can receive both DVDs and CDs.

The player 2 comprises a decoder 6 for converting data retrieved from the CD or DVD into analogue video signals VIDEO when reading a DVD and analogue audio signals AUDIO in both cases. The analogue video signals VIDEO are for instance composite video signals (CVBS) which are transmitted to a display 10 through a standard scart connector 12 (pin 19) to be viewed on the screen 8 of the display 10.

The analogue audio signals AUDIO are output on connectors 14, for instance RCA-type connectors, to be connected to the amplifier 16 of a stereo set where the sound track (from CD or DVD) is played by the loudspeakers 18. Although the AUDIO signals are represented by one line in FIG. 1, they can of course use any number of connections, for instance 2 connectors for stereo systems or 5 connectors for surround effect systems.

The various parts of the player 2 are controlled by a micro-processor 20 using a memory 22. Notably, an OSD generator 24 receives instructions from the micro-processor 20 to generate on outputs R, G , B video signals which are to be superimposed on the analogue video signals VIDEO or even cover the whole area of the screen 8. These video signals R, G, B are for instance carried by pins 15, 11 and 7 of the standard scart connector 12.

The video signals R, G, B output by the OSD generator 24 are determined by the micro-processor 20 and are meant to provide information to the user watching the display 10, for instance menus.

To complement this user interface, the player has a receiver 26 receiving signals, e.g. infrared signals, from a remote-control 28 with buttons which can be pressed by the user to control operation of the video player 2.

Upon a given action of the user on the remote-control 28 (i.e. pressing a given button), a corresponding (infrared) signal is generated by the remote-control 28, received by the receiver 26, forwarded to the micro-processor 20 and interpreted as a given user command. Such a command could be for instance to start playing a CD or to display a menu.

As explained above, a menu is displayed based on instructions from the micro-processor 20 to the OSD generator 24 which outputs video signals R, G, B which define this menu. Depending on further action of the user on the remote-control (pressing the direction buttons or arrow keys), the user can navigate the menu, i.e. choose an item of the menu of consideration. This item will correspondingly be indicated in the menu as considered, for instance by being highlighted. The highlighted item may then be selected, or a corresponding action triggered by pressing a further button.

The video player 2 allows to play tracks according to a play list, i.e. a user-defined list of tracks from the CD or DVD to be played. The play list is stored in the memory 22 associated to the micro-processor 20. When using the play list function, the micro-processor 20 instructs the disc reader 4 to play the tracks as specified in the stored play list (i.e. the specified tracks in the specified order).

The play list can be created and modified as explained below and illustrated by the example given on FIGS. 2 to 7. In these figures, a highlighted box (i.e. a highlighted screen area) is represented by a hatched box.

Figure 2:
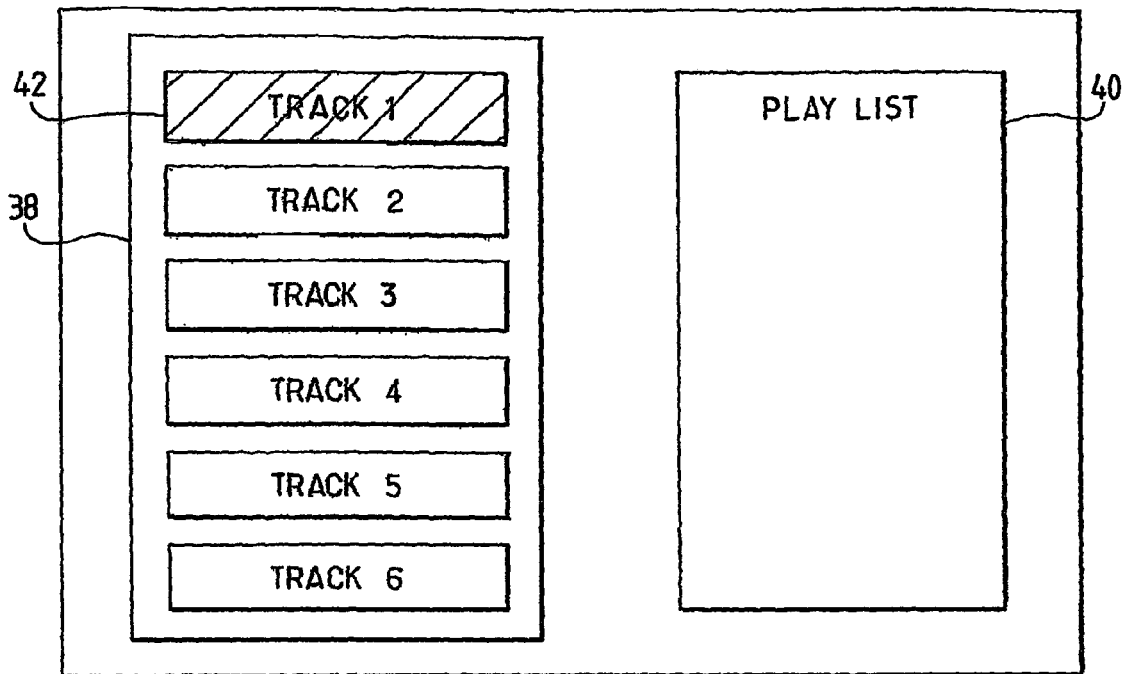
FIGS. 2 to 8 represent various possible screen contents on a display linked to the apparatus of FIG. 1.

When accessing the play list manipulation screen, as represented on FIG. 2, the play list is empty as shown in the play list area 40 (right-hand side of the screen 8) where no track listing appears.

On the left-hand side of the screen 8, a content area 38 contains a list of tracks available in the CD or DVD which is inserted in the disc reader 4. In the example described in the figures, the inserted disc has 6 tracks, referenced Track1 to Track6. Correspondingly, the content area 38 shows 6 boxes, each box representing a track and labelled Track1 to Track6.

When accessing the play list manipulation screen, the first box (starting from the top) 40 labelled and corresponding to Track 1, is highlighted by default.

In order to select a track to be entered in the play list (i.e. to be added as last element in the play list), the user has first to indicate the desired track by highlighting the corresponding box. The user moves the highlight from one box to another by using the (vertical) arrow keys 34, 36 ("up" button 34 and "down" button 36) of the remote-control 28. Then, the track corresponding to the highlighted box may be entered in the play list by pressing the "OK" button 30 (selection action). Once the desired track is entered in the play list, it is added at the end of the play list shown in the play list area 40.

Figure 3:
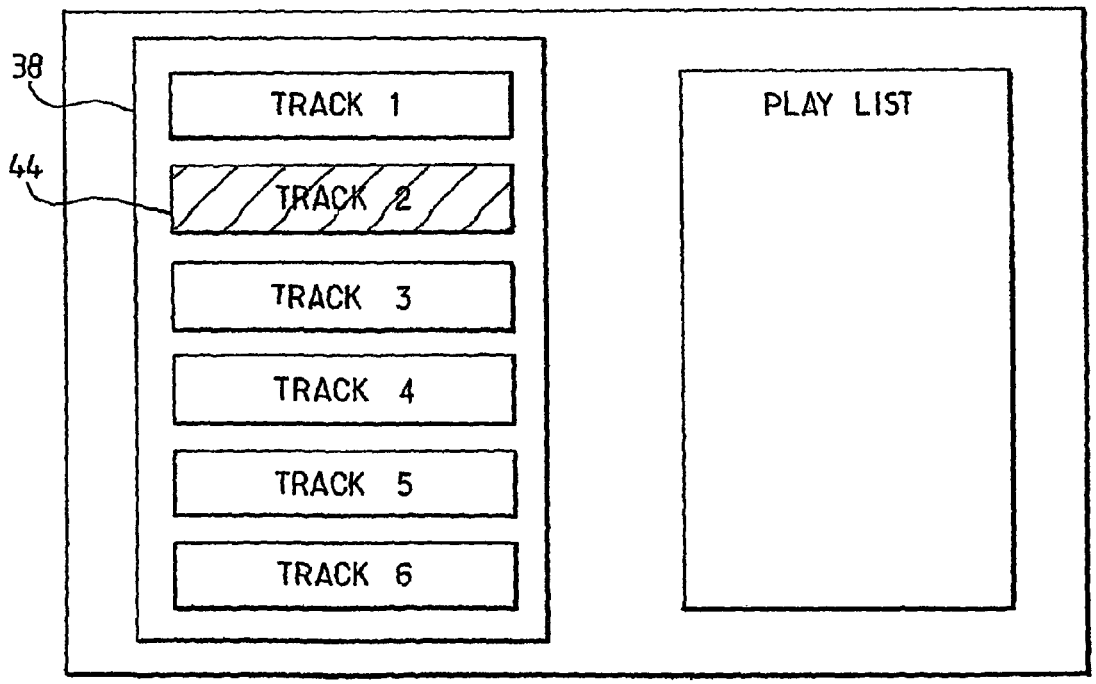
Figure 4:
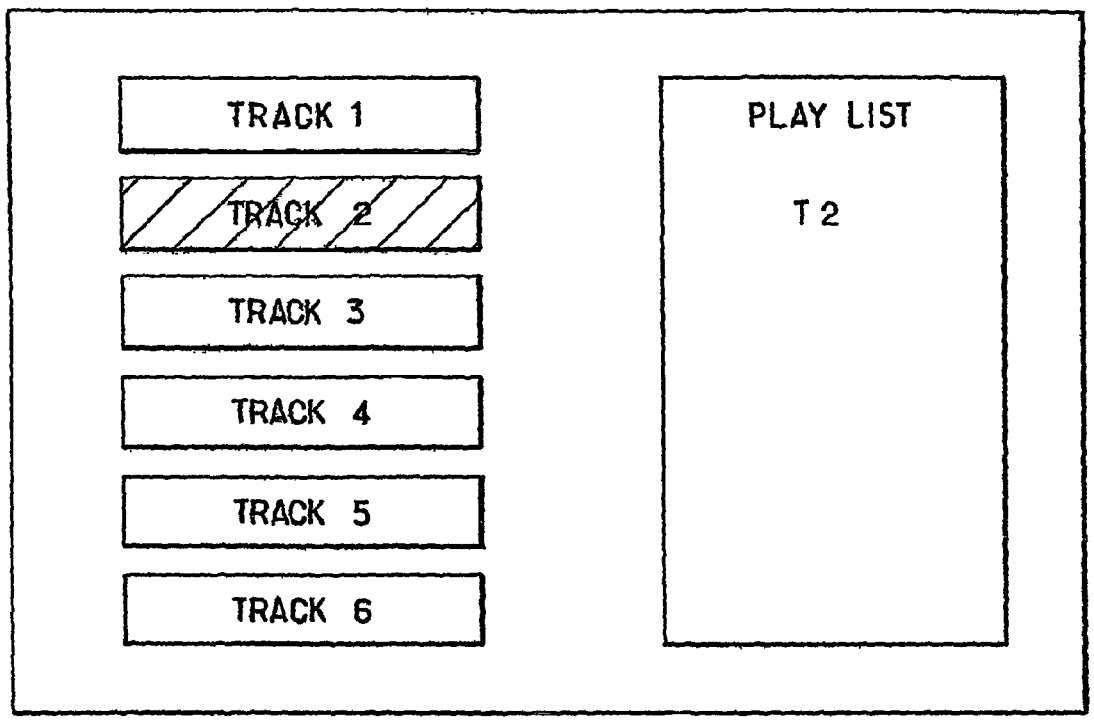
Figure 5:
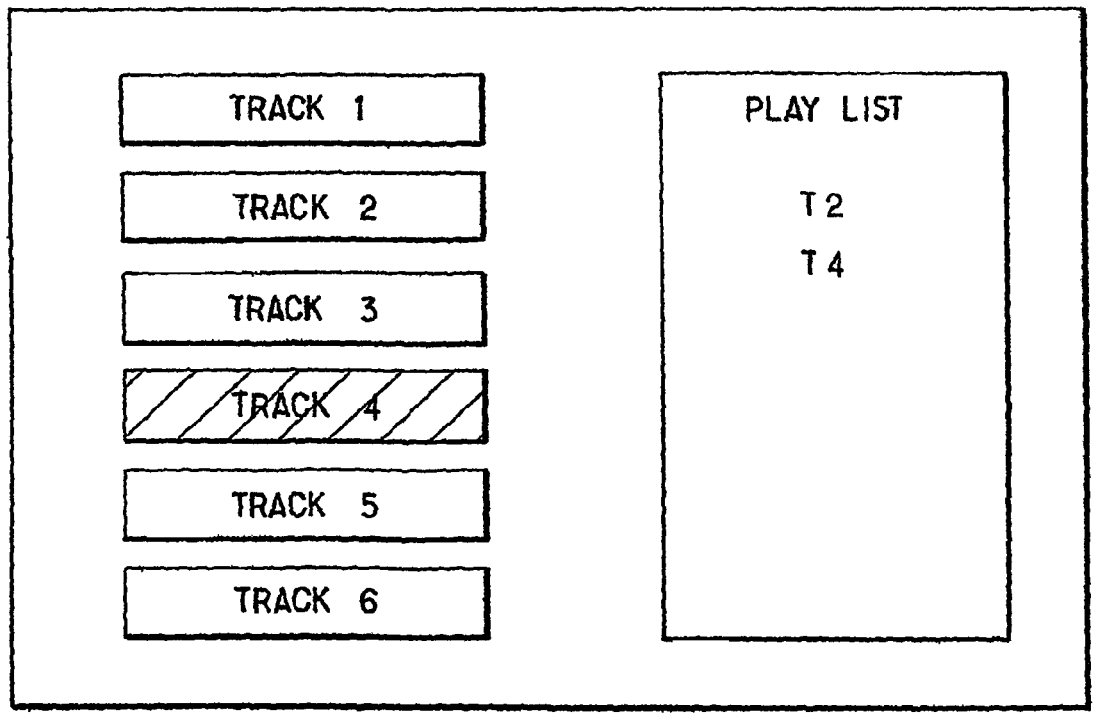

For example, when starting from the screen of FIG. 2, the user presses the "down" button 36 to highlight the second box 44 (labelled and corresponding to Track2), as shown in FIG. 3. Then, the user presses the "OK" button 30 to enter Track2 into the play list. The play list is updated accordingly and displayed in the play list area 40, as shown in FIG. 4: the play list reads "T2" indicating it contains only Track2.

Further tracks can be added in the same way. For instance, starting from the screen of FIG. 4, by pressing twice the "down" button 36, the box labelled Track4 is highlighted and, by pressing the "OK" button, Track4 is entered in the play list, which now reads "T2-T4" as represented on FIG. 5.

Figure 6:
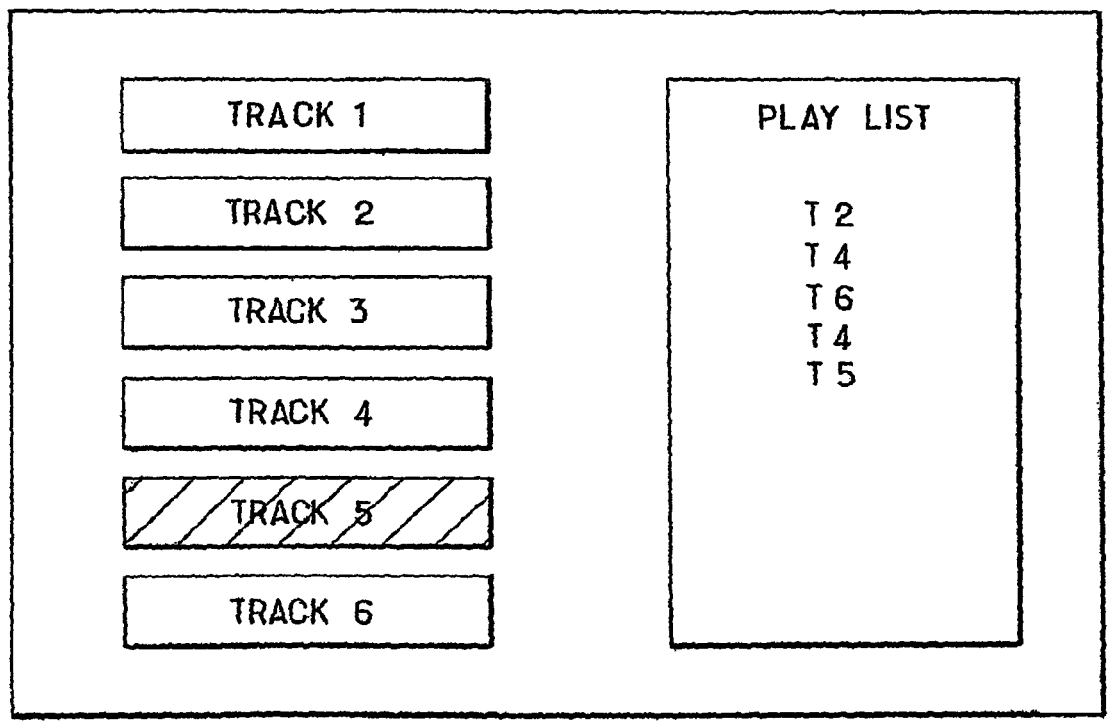

Using this scheme, the user can define a play list as shown for instance on FIG. 6 where the play list reads "T2-T4-T6-T4-T5". For the user's convenience the player 2 also makes it possible to remove elements (i.e. here tracks) from the play list as described below.

When the highlight is on a box of the content area 38 representing a given track, pressing on a "CLR" button 32 removes (i.e. deletes) this given track (or element) from the play list (if it is present in the play list) only in its last entered position. Said differently, action on the "CLR" button 32 removes from the play list (in the play list area 40) the last occurrence of the track which is highlighted in the content area 38, if such an occurrence exists.

Naturally, this notably means that, if the given track is only present once in the play list (i.e. has only one occurrence in the list), it is (i.e. this only occurrence is) removed from the play list.

If the highlighted track (i.e. precisely the track corresponding to the highlighted box in the content area 38) is not present in the play list (as displayed in the play list area 40), action on the "CLR" button 32 has no effect.

Figure 7:
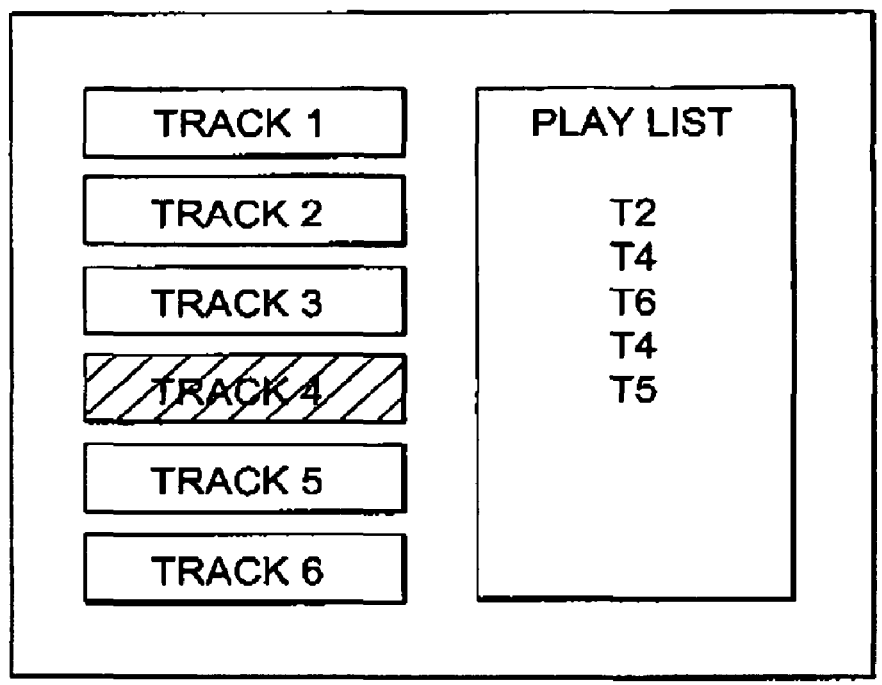

Referring back to the example, when starting from FIG. 6, the user presses the "up" button 34 to move the highlight from box "Track5" to box "Track4", but still in the content area 38, as represented in FIG. 7. The play list as visible in the play list area 40 reads "T2-T4-T6-T4-T5" as previously indicated.

Figure 8:
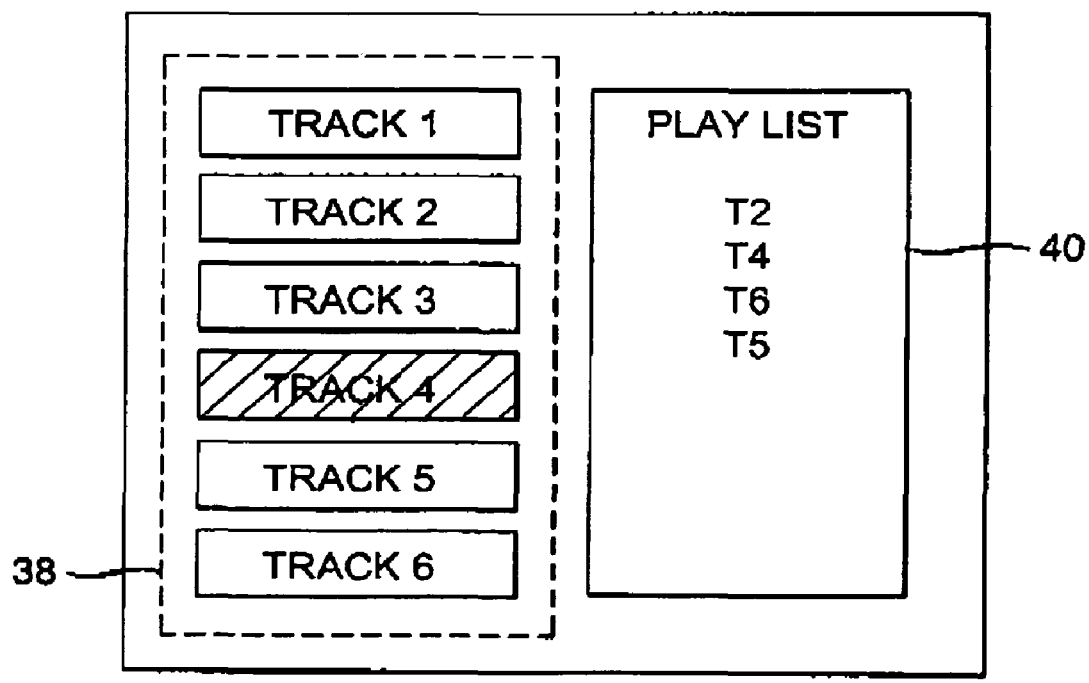

The user then presses the "CLR" button 32 which removes the last "T4" entry (as box "Track 4" is highlighted) from the play list and thus from the play list area 40. The play list then reads "T2-T4-T6-T5" as illustrated in FIG. 8.

This method of removal of an element in the play list is particularly convenient for several reasons. First, it is simple as the highlight remains in the content area 38 so that the user does not navigate the play list area 40. Nevertheless, it is possible to remove an element from the middle of the play list (not only the bottom) by highlighting the correct box in the content area. Furthermore, it is particularly fitted for modifying lists where an item (e.g. a track) may occur more than once: in such a case, it is of course desirable to give the user the possibility to have two occurrences (or more) of the same item for maximum flexibility. But, as the second (or further) occurrence often comes from a mistake from the user, it is also highly desirable to allow easy removal of this second (or further) occurrence while keeping the first one, as provided by the invention.

The invention claimed is:

1. Method for modifying a play list in an audio and/or video apparatus, comprising the steps of:
   - displaying in a first area of a screen a representation of at least part of available tracks, only one occurrence of each available track appearing in the first area,
   - displaying in a second area of the screen at least part of the current play list,
   - determining a track to be considered upon a first action introduced by a user,
   - indicating the track to be considered by a specific representation in the first area of the screen associated with the track to be considered,
   - repeating the steps of determining and indicating to enable several occurrences of the same track to be added to the play list, all the occurrences of same track appearing in the first area, the considered track being highlighted in the first area,
   - if the user introduces a second action for removing the track to be considered and highlighted in the first area of the screen, and if several occurrences of the track to be considered are displayed in the second area displaying at least part of the play list, removing the last occurrence of the track to be considered in the play list displayed in the second area.

2. Method according to claim 1, wherein the first action and the second action are actions introduced on a remote control sending signals to the apparatus.

3. Method according to claim 1, wherein said specific representation of the track to be considered is highlighting the representation in the first area of the screen associated with the track to be considered.

4. Method for modifying a play list in an audio and/or video apparatus, comprising the steps of:
   - generating video signals defining a screen with a first area displaying a representation of at least part of available tracks and a second area displaying at least part of the current play list, only one occurrence of each available track appearing in the first area,
   - determining a track to be considered upon receiving a first signal introduced by a user from a user interface,
   - indicating the track to be considered by generating video signals defining a specific representation in the first area of the screen associated with the track to be considered, the considered track being highlighted in the first area,
   - if the user introduces a second signal from the user interface, for removing the track to be considered and highlighted in the first area, and if several occurrences of the track to be considered are displayed in the second area displaying at least part of the play list, removing the last occurrence of the track to be considered in the play list displayed in the second area.

5. Method according to claim 4, wherein the user interface receives signals from a remote control.

6. Method according to claim 4, wherein said specific representation of the track to be considered is highlighting the representation in the first area of the screen associated with the track to be considered.

7. Audio and/or video apparatus having a media reader to read a medium where the data are organized in tracks, and a memory able to store a play list, comprising:
   - video means generating video signals defining a screen with a first area displaying a representation of at least part of the tracks and a second area displaying at least part of the play list, only one occurrence of each available track appearing in the first area,
   - a user interface for receiving a first signal determining a track to be considered, wherein the video means are meant to indicate the track to be considered by generating video signals defining a specific representation in the first area of the screen associated with the track to be considered, the considered track being highlighted in the first area,
   - control means for removing the track to be considered and highlighted in the first area of the screen, and if several occurrences of the track to be considered are displayed in the second area displaying at least part of the play list, said control means removing the last occurrence of the track to be considered in the play list upon receiving a second signal introduced by the user from the user interface.

8. Audio and/or video apparatus according to claim 7, wherein the user interface receives the first signal and the second signal from a remote control.

9. Audio and/or video apparatus according to claim 7, wherein said specific representation of the track to be considered is highlighting the representation in the first area of the screen associated with the track to be considered.

10. Method for modifying a list of items selected by a user from a given set, comprising the steps of:
    - displaying in a first area a representation of items of the given set, only one occurrence of each item appearing in the first area
    - displaying in a second area a list representing at least part of the previously selected items,
    - determining an item to be considered upon a first action introduced by the user,
    - indicating the item to be considered by a specific representation in the first area of the item to be considered, the considered item highlighted in the first area
    - if the user introduces a second action for removing the item to be considered and highlighted in the first area, and if several occurrences of the item to be considered are displayed in the second area, removing the last occurrence of the item to be considered in the list displayed in the second area.

* * * * *